Figure 1:
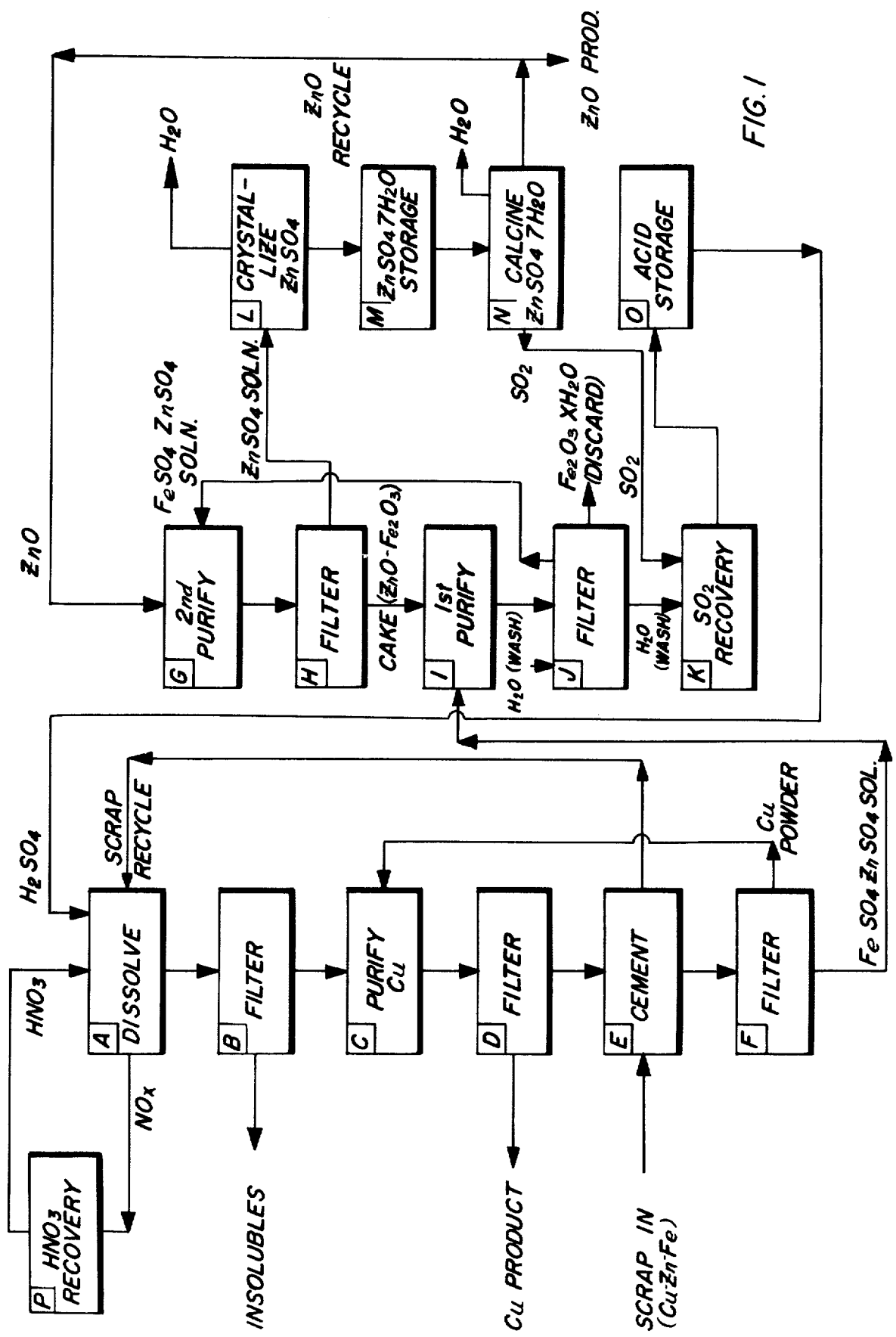

United States Patent [19]
Moore

[11] 3,933,478
[45] Jan. 20, 1976

[54] RECOVERY OF ZINC AND COPPER FROM BRASS SCRAP

[75] Inventor: Robert N. Moore, Des Plaines, Ill.

[73] Assignee: Nicosep Associates, Chicago, Ill.

[22] Filed: May 16, 1974

[21] Appl. No.: 470,624

Related U.S. Application Data

[63] Continuation-in-part of Ser. No. 391,949, Aug. 27, 1973, abandoned.

[52] U.S. Cl. .................. 75/101 R; 75/109; 75/115; 75/117; 75/120; 423/27; 423/41; 423/36; 423/106; 423/109

[51] Int. Cl.² C22B 15/08; C22B 15/12; C22B 7/00; C22B 19/22

[58] Field of Search .......... 75/117, 120, 101 R, 109, 75/115; 423/34, 41, 27, 106, 109, 99

[56] References Cited
UNITED STATES PATENTS

| | | | |
|---|---|---|---|
| 1,674,030 | 6/1928 | Allingham | 75/109 X |
| 3,054,736 | 9/1962 | Savage et al. | 75/120 X |
| 3,510,414 | 5/1970 | Orlandini et al. | 75/120 X |
| 3,691,038 | 9/1972 | von Roepenack et al. | 75/120 X |
| 3,793,429 | 2/1974 | Queneau et al. | 75/117 X |
| 3,816,105 | 6/1974 | McKay et al. | 75/115 |
| 3,832,162 | 8/1974 | Smith | 75/117 X |
| 3,849,121 | 11/1974 | Burrows | 75/117 X |

*Primary Examiner*—G. Ozaki
*Attorney, Agent, or Firm*—Merriam, Marshall, Shapiro & Klose

[57] ABSTRACT

Process for receovering copper values (and zinc, if present) from copper bearing materials, optionally in admixture with iron. The feed material is leached with a mixture of nitric and sulphuric acids, after which the dissolved copper is cemented from solution by contact with iron. The solution, containing dissolved iron (and zinc, if present in the feed material) salts is reacted with ZnO to precipitate iron as ferric oxide, which is separated, leaving zinc sulfate in solution. Solid zinc sulfate is recovered from the solution by evaporation, and then calcined to produce $SO_2$, which is recovered and recycled as $H_2SO_4$, and ZnO, which is reused in the process, any excess being recovered as a product.

12 Claims, 2 Drawing Figures

RECOVERY OF ZINC AND COPPER FROM BRASS SCRAP

This is a continuation-in-part of pending application Ser. No. 391,949, filed Aug. 27, 1973 now abandoned.

This invention relates to a method for recovering copper values from copper-bearing materials, such as sulfide ore concentrates, copper scrap, and copper alloys, and particularly from mixtures of scrap metals containing copper or copper alloys in mechanical admixture with iron or other ferrous metals. The method also permits the recovery of any zinc which may be contained in the feed material, as in the case of brass.

In one aspect of the invention, the method can be used for the recovery of copper from a material which contains other metals, particularly iron and zinc, in only minor or insignificant amounts. Such a material can be, for example, a copper sulfide ore concentrate such as chalcocite ($Cu_2S$) or covellite (CuS), or a scrap material such as copper wire. Alternatively, the method is also applicable to feed materials which contain a substantial proportion of iron and/or zinc, such as scrap mixtures of brass and iron.

The copper and zinc constituents of brass alloys have substantial value and recovery of these metals from scrap alloys is economically warranted, provided that the other materials associated with such scrap alloys do not complicate the recovery procedure. One type of scrap metal mixture which is readily available consists of copper or copper alloys such as brass, in mechanical admixture with iron or other ferrous metals. Such a scrap mixture, hereinafter referred to as "irony" brass, is produced, for example, by breaking up an electric motor in its entirety. The resulting mixture of metal fragments contains a substantial proportion of brass or copper, present in the motor in the field windings, armature, commutator, etc., and an even larger proportion of iron or ferrous alloys from the case, bearings, mounts, etc., of the motor. The presence of iron in relatively large amounts in such "irony" brass has complicated the recovery of the copper and zinc contents of the brass therein and has thus rendered economically unattractive the known processes for recovery of these metals from such mixtures.

In accordance with the present invention there is provided a novel process for the recovery of copper and zinc values from a copper-bearing material which can be in mechanical admixture with iron, in an efficient manner which minimizes the quantities of materials which must be handled in the process. In addition, the process provides for the recovery and reuse of reactants used therein, thus reducing the cost of operation and minimizing potential pollution problems.

Briefly described, in the process of the invention a charge of the copper-bearing feed material is first dissolved in a mixture of nitric and sulphuric acids, the evolved $NO_x$ gases being recovered and converted to nitric acid for reuse in the process. After filtration to remove insoluble materials, the copper in the resulting solution is then cemented out by contacting the solution with iron, the dissolved copper being reduced by the iron and precipitating out of solution. If the feed material contains iron, as in the case of "irony" brass scrap, it can be used for cementing out the copper in solution. The precipitated copper is removed and recovered, and if "irony" brass is used for cementation, the residual "irony" brass scrap is recycled to the aforementioned dissolution step.

If the feed material contains little or no iron, iron is supplied to the cementation step in any convenient form, such as iron scrap. In this case, the precipitated copper is recovered as above, but the residual iron scrap is not recycled, remaining in the cementation step for use with succeeding batches of copper solution.

The solution from cementation, containing dissolved iron and zinc (if present in the feed material) but little or no copper, is treated to reduce the iron content by reaction with solid ZnO to produce $ZnSO_4$ and a precipitate of $Fe_2O_3$, thereby reducing the concentration of iron, and increasing the concentration of zinc in solution. Although the concentration of iron in solution can be reduced substantially in one such treatment with ZnO, the residual dissolved iron content may be substantial, depending on the iron concentration in solution before treatment and the purity which is desired in the final zinc product. In order to improve the purity of the zinc product, it is preferred to carry out the treatment of the solution with ZnO in two or more stages of a countercurrent reaction extraction operation. In a first stage of the operation, the solution from cementation is contacted with a solid filter cake containing $Fe_2O_3$ and ZnO, produced in a later step of the process. The ZnO in the cake reacts with the dissolved $FeSO_4$ in the solution to produce a precipitate of hydrated $Fe_2O_3$ (referred to herein as $Fe_2O_3.xH_2O$), the process thereby consuming almost all of the solid ZnO and transforming it to $ZnSO_4$ solution. The precipitated $Fe_2O_3.xH_2O$ and the unreacted ZnO left from the filter cake are removed by filtration, leaving a solution containing $FeSO_4$ and $ZnSO_4$, which is purified in one or more subsequent stages of the operation by reaction with recycled excess solid ZnO from a later step in the process. In the purification stages, the solid ZnO reacts with the dissolved $FeSO_4$ to produce $ZnSO_4$ in solution and to precipitate substantially all of the remaining iron in the solution as $Fe_2O_3.xH_2O$. The precipitated solid $Fe_2O_3.xH_2O$ and excess ZnO not consumed in this step are removed by filtration and the filter cake is recycled to the aforementioned first stage.

The solution from the last stage of purification, now substantially free of iron and containing dissolved zinc sulfate is then crystallized to remove water and calcined to produce ZnO and $SO_2$, a part of the ZnO being recycled to the purification stage to react with dissolved $FeSO_4$ as described, the remainder of the ZnO being recovered as the desired product. The $SO_2$ evolved in the calcining step is recovered and returned as $H_2SO_4$ in the dissolution step.

Figure 2:
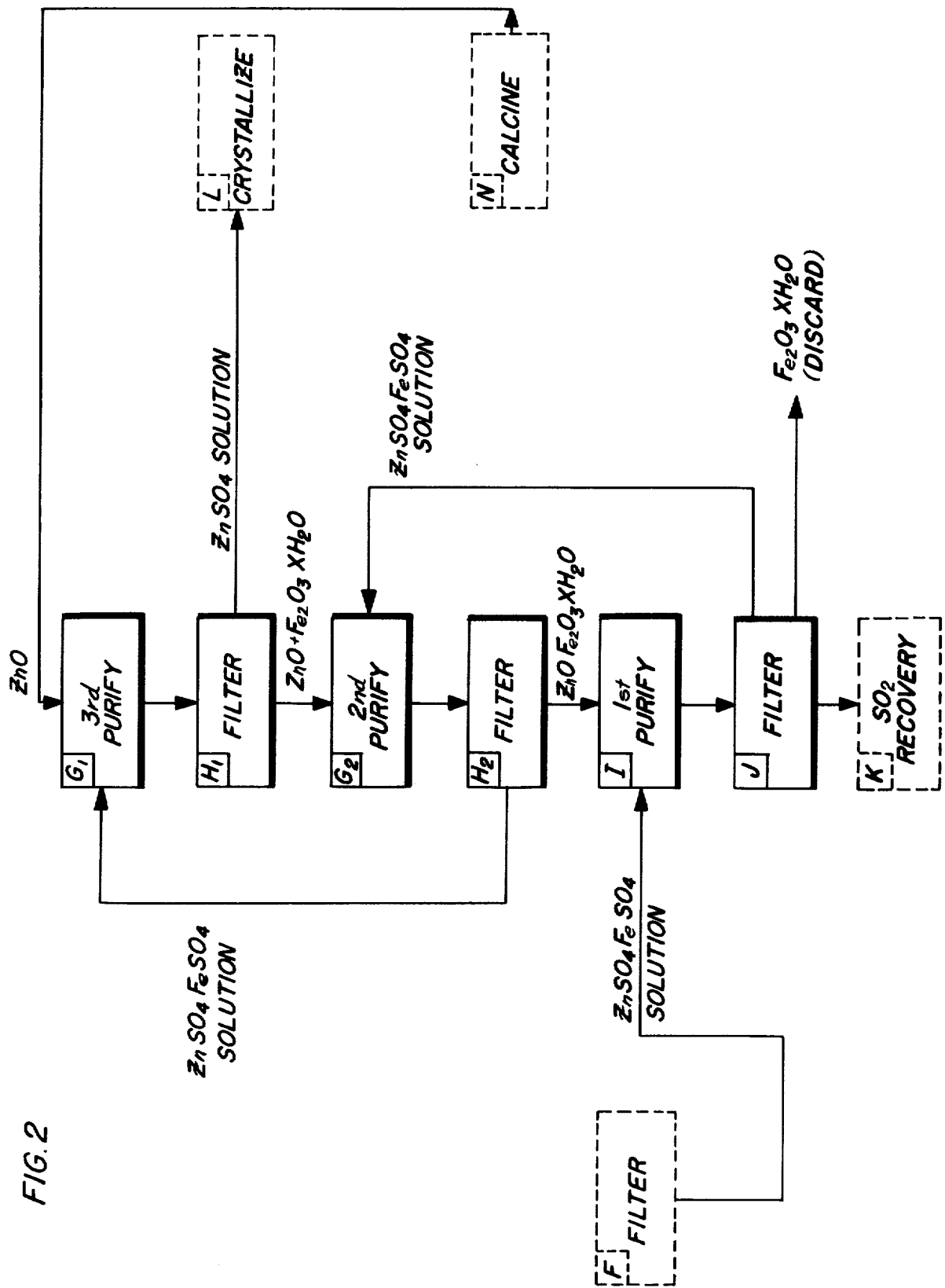

The process will be better understood from the following detailed description thereof in conjunction with the accompanying drawings, in which FIG. 1 is a block diagram showing the various steps and stages in one version of the process, and FIG. 2 is a similar diagram depicting a preferred variation in the purification zone of the process in FIG. 1.

As shown in FIG. 1, fresh "irony" brass alloy scrap is fed to Step E (Cement) of the process. A typical "irony" brass used in the process consists of 25 parts of copper, 12 parts of zinc, 60 parts of iron, 2 parts of lead, and 1 part of tin, per 100 parts of scrap, exclusive of insoluble inert materials such as rubber and plastics. The process will be described assuming a charge of 100 parts of such an "irony" brass scrap, and the composition and weights of the various streams will be described with respect thereto.

In Step E, (Cement), the "irony" brass scrap, preferably comminuted in small pieces for ease of handling and for increasing the surface area available for reaction, is contacted with a liquid stream leaving Filter D, containing 618 parts H$_2$O, 50 parts H$_2$SO$_4$, 63 parts CuSO$_4$ (25 Cu), 30 parts ZnSO$_4$ (12 Zn), and 95 parts FeSO$_4$ (35 Fe). In Step E, the copper in solution is reduced by a portion of the iron content of the scrap and precipitates out as a finely divided solid, an amount of iron approximately equivalent to the precipitated copper going into solution. There is accordingly produced in Step E, 25 parts of precipitated finely divided copper, containing minor proportions of occluded, entrained, or precipitated impurities, and the dissolved FeSO$_4$ content of the solution increases to 163 parts (60 Fe).

The liquid phase from Step E, containing the finely divided copper suspended therein, is removed from the residual alloy scrap and transferred to Step F (Filter), in which the 25 parts of suspended copper are separated from the solution. The residual scrap from Step E (25 parts Cu, 12 Zn, 35 Fe, 2 Pb, 1 Sn) is recycled to earlier Step A (Dissolve), in which the residual scrap is dissolved in a mixture of aqueous sulphuric acid (170 parts H$_2$SO$_4$, 360 H$_2$O), and aqueous nitric acid (75 parts HNO$_3$, 215 parts H$_2$O), the nitric acid acting as a promoter or catalyst for the dissolution. It will be found generally desirable or necessary to allow the dissolution step to proceed for at least about 12 hours in order to permit the metal charge to go into solution. In Step A, there is produced a gaseous by-product consisting of nitric oxides (NO$_x$) which are recovered as HNO$_3$ in HNO$_3$ Recovery system P in a conventional manner and returned to Step A for reuse.

In Step B (Filter), any insoluble materials in the scrap alloy fed to the process in Step E, such as rubber and plastics, and any trace metal components, e.g., insoluble lead and tin salts, are removed by filtration in a conventional manner. The solution leaving Step B, consisting of 63 parts CuSO$_4$ (25 Cu), 30 parts ZnSO$_4$ (12 Zn), 95 parts FeSO$_4$ (35 Fe), 50 parts H$_2$SO$_4$, and 618 parts H$_2$O, is mixed in Step C with the precipitated copper powder produced in Step F, in order to dissolve the small quantity of iron entrained or trapped in the copper powder. The resulting mixture is filtered in Step D and the solid copper content (25 parts) is removed as a desired product. The resulting copper product product is at least about 97% pure, the impurities consisting of minor amounts of iron, tin and lead. The copper product can be further purified as desired or necessary by conventional means.

The liquid phase from Step D is then passed to Step E and reacted with the incoming scrap feed as previously described.

The solution from Step F (Filter), comprising 618 parts H$_2$O, 45 parts H$_2$SO$_4$, 163 parts FeSO$_4$ (60 Fe), and 30 parts ZnSO$_4$ (12 Zn), is then transferred to Step I (1st Purify) in which it is contacted with a filter cake consisting of solid ZnO and Fe$_2$O$_3$.xH$_2$O. The filter cake is produced in Step H (Filter) and contains 146 parts Fe$_2$O$_3$.xH$_2$O (42 Fe) and 67 parts ZnO (54 Zn). In Step I, the ZnO present in the filter cake reacts with the FeSO$_4$ dissolved in the solution from Step F to produce a precipitate of Fe$_2$O$_3$.xH$_2$O, and ZnSO$_4$ dissolved in the solution, in accordance with the following possible reaction:

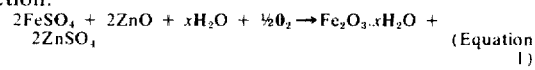

$$2FeSO_4 + 2ZnO + xH_2O + \tfrac{1}{2}O_2 \rightarrow Fe_2O_3.xH_2O + 2ZnSO_4 \quad \text{(Equation 1)}$$

The amount of ZnO in the filter cake is adjusted, as described below, such that almost all of the ZnO is consumed in this reaction.

In one version of the process, as shown in FIG. 1, the reaction mixture from Step I is filtered to Step J and the solid phase, consisting essentially of Fe$_2$O$_3$.xH$_2$O together with a small amount of unreacted ZnO, is removed and discarded. The filtrate from Step J, containing dissolved FeSO$_4$ and ZnSO$_4$, is recycled to Step G (2nd Purify), to which there is added an excess of solid ZnO from a later step M in the process. In Step G, the dissolved FeSO$_4$ reacts with the added ZnO to produce ZnSO$_4$ in solution and Fe$_2$O$_3$.xH$_2$O as a precipitate, in accordance with Equation 1. The amount of ZnO added in Step G is selected to be more than sufficient to consume all of the dissolved FeSO$_4$ and convert it to Fe$_2$O$_3$.xH$_2$O, the excess ZnO being available for use in the reaction in Step I. In Step H, the reaction mixture from Step G is filtered, and the solid phase, a cake consisting of a mixture of precipitated Fe$_2$O$_3$.xH$_2$O and excess unreacted ZnO, is sent to Step I, as previously explained. The filtrate from Step H, containing dissolved ZnSO$_4$, is then treated in a manner to be described for recovery of its zinc and SO$_3$ content.

In an alternative and preferred version of the invention, the purification steps G, H, I, and J described above are modified to provide additional reaction and filtration Steps, as shown in FIG. 2. In this alternative version, only the purification steps, in which solid ZnO is used to convert dissolved FeSO$_4$ to solid Fe$_2$O$_3$.xH$_2$O and permits its removal, have been changed; the rest of the process is identical to the corresponding steps shown in FIG. 1.

Referring to FIG. 2, the purification steps G$_1$, H$_1$, G$_2$, H$_2$, I, and J constitute in effect a countercurrent reaction extraction process in which the solid material, starting with ZnO in Step G, is reacted consecutively with a countercurrent stream of solutions containing dissolved ZnSO$_4$ and FeSO$_4$. As the solids move from Step G$_1$ to Step J, the ZnO content thereof decreases and the concentration of solid Fe$_2$O$_3$.xH$_2$O generated in the extraction reaction increases. In the solution, moving generally in a countercurrent direction from Step I to Step G$_1$, the concentration of ZnSO$_4$, produced by reaction of dissolved FeSO$_4$ with ZnO, increases, accompanied by a corresponding decrease in FeSO$_4$ concentration.

On the basis of the initial charge of 100 parts of "irony" brass originally assumed, the filtrate from Step F, (FIG. 2), containing 618 parts H$_2$O, 45 parts H$_2$SO$_4$, 163 parts FeSO$_4$ (60 Fe) and 30 parts ZnSO$_4$ (12 Zn), is contacted in Step I with a filter cake containing 67 parts ZnO (54 Zn) and 146 parts Fe$_2$O$_3$.xH$_2$O (42 Fe) produced in Step H$_2$. As previously explained, the reaction (Equation 1) in Step I produces a precipitate containing 210 parts Fe$_2$O$_3$.xH$_2$O (60 Fe) while the amount of solid ZnO is reduced to 3 parts (2 Zn). These solid materials are removed by filtration in Step J, leaving a filtrate consisting of 113 parts FeSO$_4$ (42 Fe), 100 parts ZnSO$_4$ (41 Zn) and 621 parts H$_2$O, which is transferred to Step G$_2$, in which it is contacted with a filter cake produced in Step H$_1$. The filter cake contains 126 parts ZnO (101 Zn) and 4 parts $Fe_2O_3 \cdot xH_2O$ (1 Fe) and reacts with the $ZnSO_4$–$FeSO_4$ solution in Step $G_2$ to produce a mixture of 67 parts solid ZnO (54 Zn), 146 parts solid $Fe_2O_3 \cdot xH_2O$, and a liquid phase consisting of 217 parts $ZnSO_4$ (88 Zn), 3 $FeSO_4$ (1 Fe) and 608 parts $H_2O$.

In Step $H_2$, the reaction mixture from Step $G_2$ is filtered, the filter cake going to Step I as previously described, while the filtrate is transferred to Step $G_1$. In Step $G_1$, the $FeSO_4$ in solution reacts with solid ZnO (128 parts; 102 Zn) recycled from Step N, as a result of which the residual $FeSO_4$ content of the solution is eliminated. The reaction mixture from Step $G_1$ is filtered in Step $H_1$ and the filtrate, consisting of 277 parts $ZnSO_4$ (112 Zn) and 608 parts water, is transferred to Step L, the filter cake passing to Step $G_2$ for use as previously described.

In Step L, the water is removed from the solution by conventional means, to produce solid $ZnSO_4 \cdot 7H_2O$ (493 parts; 112 Zn), which is stored in Step M.

From Step M, the solid $ZnSO_4 \cdot 7H_2O$ is transferred to Step N (Calcine), where it is heated to remove the water of crystallization (216 parts). On continued heating, to a temperature of approximately 600°C., the $ZnSO_4$ dissociates into ZnO and $SO_2$ (102 parts). A portion of the ZnO thus produced (12 parts; 10 Zn) is recovered as the desired product; the remainder of the ZnO (128 parts; 102 Zn) is recycled to Step G as previously described for use in removing iron from the $ZnSO_4$ solution.

The amount of ZnO recycled to Step $G_1$ is chosen to be stoichiometrically equivalent to the quantity of $FeSO_4$ and $H_2SO_4$ introduced to Step I, plus a small excess to insure completeness of the reaction. The solution leaving Step $G_2$ should desirably contain a small concentration of $FeSO_4$, which is recycled to Step $G_1$ for reaction with solid ZnO. It is preferred that the concentration of $FeSO_4$ in the stream entering Step $G_2$ be about ½ – ⅔ the concentration of $FeSO_4$. If the concentration of $FeSO_4$ in the solution entering Step $G_2$ is too low, the reaction will be incomplete, and excessive unreacted ZnO will remain in the solid $Fe_2O_3 \cdot xH_2O$ eventually discarded from Step J. On the other hand, concentrations of $FeSO_4$ in Step $G_2$ much above ⅔ the corresponding concentration in Step I provide no benefit and entail the handling of unnecessarily large quantities of materials.

The gaseous stream of $SO_2$ leaving Step N is transferred to Step K, in which it is oxidized in conventional fashion and absorbed in the water (391 parts) used in Step J to wash the filter cake of $Fe_2O_3 \cdot xH_2O$. As a result of Step K, there is produced a solution of $H_2SO_4$ which is stored in Step O and recycled to Step A for dissolving the recycled scrap metal as previously described. Makeup $H_2SO_4$ can be added to this stream as necessary to supply any losses which occur during handling of the materials in the process.

It will be seen that the process described herein separates the scrap feed into its component parts of copper (containing traces of other metals), zinc (as ZnO), and iron (as $Fe_2O_3 \cdot xH_2O$). In addition, the valuable by-product streams, such as nitric oxides and $SO_2$, are recovered and reused in the process, thus improving the economy thereof. The countercurrent reaction system for removal of the iron adds considerably to the efficiency to the process and makes it possible to reduce the amounts of materials which must be handled in order to accomplish the separation, while at the same time permitting the process to be controlled and the desired products to be obtained in desirably high purity.

In using the process of the invention with feed materials other than "irony" brass as described above, the process is modified as necessary. For example, if the feed material is a conventional copper sulfide ore concentrate, such as one produced by the floatation process and containing little or no zinc or iron, the copper is leached out of the concentrate using a mixture of sulfuric and nitric acids as described. The solution, containing copper ions, is then contacted with any convenient form of iron, such as iron scrap, to cement out the copper. The solution after cementation, containing dissolved iron sulfate, is then treated with ZnO from another source to precipitate out the iron as $Fe_2O_3 \cdot xH_2O$ leaving $ZnSO_4$ in solution. The solution is crystallized to recover solid $ZnSO_4$, which is then calcined to produce solid ZnO for reuse in the process and $SO_2$ which is converted to $H_2SO_4$ in conventional fashion and recycled to the process. To the extent that the feedstock contains zinc or iron, the feed itself can be used in whole or in part as the source of these materials, as described above.

The foregoing detailed description has been given for clearness of understanding only, and no unnecessary limitation should be understood therefrom as modifications will be obvious to those skilled in the art.

We claim:

1. A process for recovering copper values from a copper-bearing feed material which process comprises:
    a. leaching said copper out of said feed material by treating with aqueous sulfuric acid, in the presence of nitric acid as a promoter, to produce a solution containing copper ions;
    b. cementing copper as a finely divided solid precipitate out of the solution resulting from step (a) by contacting said solution with an excess of iron;
    c. separating and recovering said precipitated copper from the aqueous solution resulting in step (b), said solution containing dissolved ferrous sulfate;
    d. contacting the solution from step (c) with solid ZnO, said ZnO reacting with said dissolved ferrous sulfate to produce a precipitate of hydrated $Fe_2O_3$ and zinc sulfate in solution, whereby the concentration of ferrous sulfate in solution is reduced;
    e. removing the solid materials remaining after the reaction in step (d), leaving a solution containing dissolved zinc sulfate; and
    f. removing water from the solution resulting in step (e) to produce a solid product comprising zinc sulfate.

2. The process of claim 1 wherein said feed material is a copper sulfide ore concentrate.

3. The process of claim 1 wherein said feed material is scrap copper in admixture with nonmetallic material.

4. The process of claim 1 in which said solid zinc sulfate product is calcined to produce ZnO, which is recycled to step (d) in the process.

5. A process for recovering zinc and copper values from alloys thereof which process comprises:
    a. dissolving said copper-zinc alloy in aqueous sulfuric acid, in the presence of nitric acid as a promoter;
    b. cementing copper as a finely divided solid precipitate out of the solution resulting from step (a) by contacting said solution with an excess of iron;

c. separating and recovering said precipitated copper from the aqueous solution resulting in step (b), said solution containing dissolved ferrous sulfate and zinc sulfate;
d. contacting the solution from step (c) with a mixture of hydrated $Fe_2O_3$ and ZnO produced in another step in the process, said ZnO reacting with a portion of said dissolved ferrous sulfate to produce a precipitate of hydrated $Fe_2O_3$ and zinc sulfate in solution;
e. removing said precipitated hydrated $Fe_2O_3$ from the reaction mixture in step (d), leaving a solution containing dissolved zinc sulfate and ferrous sulfate;
f. contacting the solution from step (e) with an excess of solid ZnO produced in another step in the process, a portion of said ZnO reacting with said dissolved ferrous sulfate to produce a precipitate of hydrated $Fe_2O_3$ and zinc sulfate in solution;
g. removing the precipitated hydrated $Fe_2O_3$ and solid residual ZnO from the solution produced in step (f) and recycling said solid materials to step (d) above;
h. removing water from the solution resulting in step (g) to produce solid zinc sulfate;
i. calcining said zinc sulfate from step (h) to produce ZnO, recycling a portion thereof to step (f), and recovering the remaining ZnO as a desired product.

6. A process for recovering zinc and copper values from alloys thereof in mechanical admixture with iron, which process comprises:
a. dissolving a first mechanical mixture comprising iron and copper-zinc alloy in aqueous sulfuric acid, in the presence of nitric acid as a promoter;
b. cementing copper as a finely divided solid precipitate out of the solution resulting from step (a) by contacting said solution with an excess of a second mechanical mixture of iron and copper-zinc alloy, the metal residue remaining from said second mixture after said cementing being recycled to step (a);
c. separating and recovering said precipitated copper from the aqueous solution resulting in step (b), said solution containing dissolved ferrous sulfate and zinc sulfate;
d. contacting the solution from step (c) with solid ZnO, said ZnO reacting with said dissolved ferrous sulfate to produce a precipitate of hydrated $Fe_2O_3$, whereby the concentration of ferrous sulfate in solution is reduced and the concentration of zinc sulfate in solution is increased;
e. removing the solid materials remaining after the reaction in step (d), leaving a solution containing dissolved zinc sulfate; and
f. removing water from the solution resulting in step (e) to produce a solid product comprising zinc sulfate.

7. A process for recovering zinc and copper values from alloys thereof in mechanical admixture with iron, which process comprises:

a. dissolving a first mechanical mixture comprising iron and a copper-zinc alloy in aqueous sulfuric acid, in the presence of nitric acid as a promoter;
b. cementing copper as a finely divided solid precipitate out of the solution resulting from step (a) by contacting said solution with an excess of a second mechanical mixture of iron and copper-zinc alloy, the metal residue remaining from said second mixture after said cementing being recycled to step (a);
c. separating and recovering said precipitated copper from the aqueous solution resulting in step (b), said solution containing dissolved ferrous sulfate and zinc sulfate;
d. contacting the solution from step (c) with a mixture of hydrated $Fe_2O_3$ and ZnO produced in another step in the process, said ZnO reacting with a portion of said dissolved ferrous sulfate to produce a precipitate of hydrated $Fe_2O_3$ and zinc sulfate in solution;
e. removing said precipitated hydrated $Fe_2O_3$ from the reaction mixture in step (d), leaving a solution containing dissolved zinc sulfate and ferrous sulfate;
f. contacting the solution from step (e) with an excess of solid ZnO produced in another step in the process, a portion of said ZnO reacting with said dissolved ferrous sulfate to produce a precipitate of hydrated $Fe_2O_3$ and zinc sulfate in solution;
g. removing the precipitated hydrated $Fe_2O_3$ and solid residual ZnO from the solution produced in step (f) and recycling said solid materials to step (d) above;
h. removing water from the solution resulting in step (g) to produce solid zinc sulfate;
i. calcining said zinc sulfate from step (h) to produce ZnO, recycling a portion thereof to step (f), and recovering the remaining ZnO as a desired product.

8. The process of claim 7 in which step (f) is carried out in a countercurrent extraction comprising two or more stages, in each of which an aqueous solution containing dissolved zinc sulfate and ferrous sulfate is reacted with a solid fraction comprising zinc oxide from a preceeding stage, said solutions and said solid fractions moving countercurrently to each other.

9. The process of claim 7 in which any insoluble material remaining after dissolution step (a) is separated from the solution prior to step (b).

10. The process of claim 7 in which the finely divided copper produced in step (b) is purified by being recycled and mixed with the solution produced in step (a), said recycled copper being separated from said solution prior to cementing step (b).

11. The process of claim 7 in which nitrogen oxide gases produced in step (a) are recovered and recycled to the process as said nitric acid.

12. The process of claim 7 in which $SO_2$ evolved in the calcining of $ZnSO_4$ in step (i) is recovered by absorption in water and recycled to step (a) as said aqueous sulfuric acid.

* * * * *